(12) United States Patent
Schorloff et al.

(10) Patent No.: US 7,401,766 B2
(45) Date of Patent: Jul. 22, 2008

(54) CHANGE OF DIRECTION DEVICE FOR HAZARDOUS ITEMS

(75) Inventors: Mike Schorloff, Kingston (CA); Gary Marino, Kingston (CA); Derek R. Ivany, Ottawa (CA)

(73) Assignee: Her Majesty TheQueen in Right of Canada as Represented by The Solictor General of Canada, Ottawa (CA)

( * ) Notice: Subject to any disclaimer, the term of this patent is extended or adjusted under 35 U.S.C. 154(b) by 536 days.

(21) Appl. No.: 11/139,784

(22) Filed: May 31, 2005

(65) Prior Publication Data

US 2006/0163544 A1    Jul. 27, 2006

Related U.S. Application Data

(60) Provisional application No. 60/575,568, filed on Jun. 1, 2004.

(51) Int. Cl.
*B66D 3/04* (2006.01)

(52) U.S. Cl. .......................... 254/389; 411/29; 411/44; 411/337

(58) Field of Classification Search ................. 254/389; 411/5, 21, 29, 44, 337
See application file for complete search history.

(56) References Cited

U.S. PATENT DOCUMENTS

| | | | |
|---|---|---|---|
| 3,842,709 A | 10/1974 | Fuqua | |
| 5,207,464 A | 5/1993 | Reeves, Jr. | |
| 5,829,391 A | 11/1998 | Krietzman et al. | |
| 6,318,941 B1 * | 11/2001 | Guenther | 411/342 |
| 6,632,108 B1 * | 10/2003 | Hohlfelder | 439/709 |

FOREIGN PATENT DOCUMENTS

| | | |
|---|---|---|
| CA | 1 245 485 | 11/1988 |
| GB | 2 330 887 A | 5/1999 |

* cited by examiner

*Primary Examiner*—Emmanuel M Marcelo
(74) *Attorney, Agent, or Firm*—Jones, Tullar & Cooper, P.C.

(57) ABSTRACT

The invention provides a "change of direction" device for use by a law enforcement technician. The device can be readily and easily attached to a building element and will allow the technician to pass a rope, wire or cable therethrough so that the rope, wire or cable can be pulled by the technician after one end has been attached to a hazardous item of concern. The change of direction device (CODD) would be positioned within the building at strategic locations where it is clear that the item of concern will have to change directions as it is being pulled from the location at which it was found. The invention provides several embodiments of the CODD for attachment to a wall, to a door hinge, or under the bottom edge of a door. Each CODD is simple in construction and is of such a nature that it can be positioned at the desired location without any preparation having to be done. In the case of the door and hinge CODD's they can be removed at a later point in time for re-use if necessary.

11 Claims, 5 Drawing Sheets

CHANGE OF DIRECTION DEVICE FOR HAZARDOUS ITEMS

The present invention relates to a change of direction device, a device which can be used by law enforcement agencies and/or armed forces to aid them in dealing with harmful items, in particular explosive devices and other items of a potentially dangerous nature.

BACKGROUND OF THE INVENTION

Law enforcement agencies and/or armed forces personnel are often faced with a task of dealing with potentially dangerous items, possibly of an explosive nature, or possibly of a toxic or other hazardous nature. Skilled technicians are highly trained to deal with such items, whether by de-fusing an explosive device or removing such a device from an area where the activation thereof could be devastating to people in the surrounding area, to buildings, or to other structures, including vehicles. The trained disposal technicians already have various tools available to them so that they can carry out their tasks with as little risk to their own lives as possible. For example, bomb disposal technicians have explosive disposal robots available to them, which robots are remotely controlled and can explore, with relative safety, areas where it is difficult for an individual to obtain safe access. Such robots are equipped with television cameras to relay information to the technicians controlling the robot, with grippers and other manipulable devices for picking up items of concern, with high pressure water cannons for destroying items of concern, and/or with sensors for determining the nature of an item of concern. U.S. Pat. No. 6,113,343 of Sep. 5, 2000 is illustrative of such robots.

In other instances, where a remotely controlled robot cannot easily reach an item of concern, or where such a robot is not readily available, it is necessary for one or more technicians to approach an item of concern and to, in many cases, remove that item from its position of rest. It is very dangerous for the technicians to approach an item of concern and to handle that item, especially when the item is located in a high-traffic area. It is often necessary, or advisable, to try to remove the item to an area where there is a reduced chance of danger to the technician or to the immediate area where the item is found. When removing an item of concern from a site it is necessary that the technician minimize as much as possible his or her contact with the item. There is always the possibility that the item is armed in such a manner that movement may trigger the item to explode or release toxic material.

There is a need for a technician to be able to utilize ropes and other pulls for hooking the item and pulling it away from its found location to a safer location where it can be dealt with in greater safety. When using such pulls it is often necessary to pull the item through doorways of a building and to follow a path that may be circuitous and certainly not straight. The task of pulling an object through a building would be greatly facilitated if there were available to the technician a device which could be readily and easily attached to elements of a building to aid in allowing a rope to pull an item through a building while changing the direction of such movement without requiring the technician to be present at the point where a direction of pull has to change. At the moment there are no such devices available to a technician. Presently, the technician must improvise any change of direction by tying ropes or other fasteners around existing articles within the building or structure. This increases the time that the technician would be exposed in close proximity to the danger.

SUMMARY OF THE INVENTION

The present invention relates to a "change of direction" device which a technician can readily and easily attach to a building element and which will allow him or her to pass a rope, wire or cable therethrough so that the rope, wire or cable can be pulled by the technician after one end has been attached to the item of concern. The change of direction device (CODD for short) would be positioned within the building at strategic locations where it is clear that the item of concern will have to change directions as it is being pulled from the location at which it was found. The present invention provides several embodiments of the CODD for attachment to a wall, to a door hinge, or under the bottom edge of a door. Each CODD is simple in construction and is of such a nature that it can be positioned at the desired location without any preparation having to be done. In the case of the door and hinge CODD's they can be removed at a later point in time for re-use if necessary. Even the wall CODD can be removed from a drywall wall, although it might be necessary to destroy a portion of the wall to do so.

The wall CODD comprises three main components: (a) a hollow shank member having a sharp end for penetrating a sheet of drywall and a disc at the opposite end to prevent over penetration; (b) a toggle-type drywall anchor member for securing the wall CODD to drywall; and (c) a threaded thumbwheel disc which attaches to the anchor member. The toggle-type anchor member includes a threaded member which extends through the hollow shank member, the disc and the thumbwheel. The toggle members of the anchor member would be held in a folded condition within the shank member while the wall CODD is being deployed. The shank member is provided with a pair of lateral opposed openings through which the toggle members will extend as the thumbwheel is rotated. As the threaded thumbwheel is turned clockwise the threaded screw member is drawn through the thumbwheel until the toggle members contact the rear surface of the drywall. The wall will then be clamped between the toggle members and the rear surface of the disc. The thumbwheel is drilled in close proximity to the centre thereof to accept a wire loop. Once the wall CODD is anchored in place a rope, wire or cable could be passed through the wire loop with the loop providing an apex of the path along which the item of concern is to be pulled.

The hinge CODD is a simple device that includes an elongated rectangular block member having a longitudinally extending bore therein and a slot in the wall thereof, the slot being of a width sufficient to accept the leafs of a protruding hinge of a closed door. The hinge CODD could be slid downwardly over such a closed hinge with the cylindrical portion of the hinge received in the bore. A thumbscrew with a threaded pointed shank extends through the cylindrical member to help anchor the hinge CODD in place. An apertured lug extends outwardly from the block member to perform the same function as the wire loop of the wall CODD. There is a rectangular slot through the elongated rectangular block. This slot is designed to accept a rectangular bar which is adjustable from side to side. The rectangular bar has at each end thereof a thumbscrew with a threaded shank that extends through the bar to further anchor the hinge CODD to the door.

The door CODD can be easily slid under the bottom edge of a door, even with the door closed and locked, and then tightly secured to the door itself. There is a bottom plate which has three transverse hinges therein, defining a main elongated section, a pair of intermediate short plate sections, and an elongated upper plate section. At the end of the upper elongated section, opposite the hinge thereof, there is a transversely extending rectangular block. This block can slide on rails that are attached to the bottom plate. Passing through the block are two spring-loaded pins. Welded to the centre of the block, between the two pins, is a bolt through which a threaded thumbscrew passes. Along the surface of the upper plate there is a movable transverse block located between the hinge and the rectangular block. The movable block uses the upper plate section as a guide or rail. In use, the plates are slid under the bottom edge of a door until the movable block comes into contact with the door outer surface. The blocks are held in place by the operator who draws the bottom plate back towards himself, away from the door. This causes the hinges to fold. The shorter intermediate plate will move into a generally vertical orientation and into contact with the inner surface of the door while the second intermediate plate will be angled forwardly and downwardly. The spring-loaded pins will lock into holes in the bottom plate. The locks the plates into position. The threaded thumbscrew is turned clockwise, advancing the movable block against the door outer surface. The device is now clamped to the bottom of the door. Once the door CODD is fixed in place, a rope, wire or cable can be attached to a rearwardly protruding aperture bar, located on the upper surface of the movable block.

BRIEF DESCRIPTION OF THE DRAWINGS

The present invention will now be described in greater detail and with reference to the drawings wherein.

DESCRIPTION OF THE PREFERRED EMBODIMENTS

Figure 1:
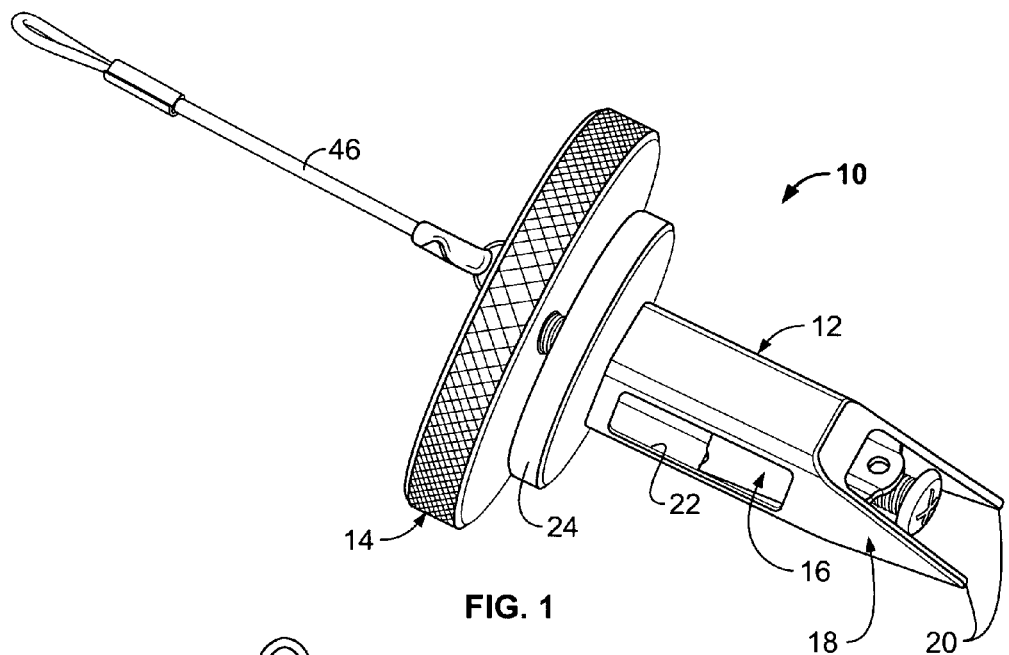
FIG. 1 is a perspective view of a wall CODD with the toggle members thereof retracted.
Figure 2:
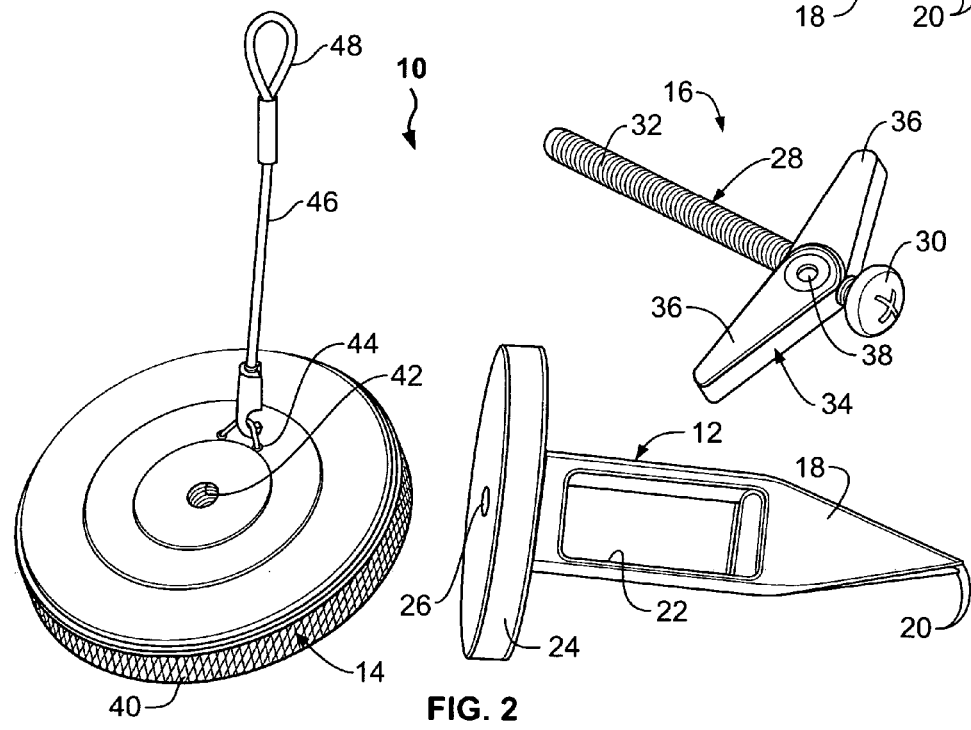
FIG. 2 is an exploded view of the wall CODD showing the individual components thereof.

The wall CODD of the present invention is shown in FIG. 1 as item 10. The wall CODD includes three elements, seen in FIG. 2 in greater detail, namely a hollow shank member 12, a thumbwheel 14, and a toggle-type clamping member 16. As seen in FIG. 2, the shank member 12 has a generally rectangular or square cross section with a sloping end 18 defining a pair of spaced apart sharp points 20. The shank member is provided with a pair of elongated laterally opposed openings 22 which provide access to the hollow interior of the shank member.

The shank member 12 is shown as having a generally circular disc or plate section 24 welded thereto at the end opposite the sharp points 20. The disc 24 has a central bore 26 extending therethrough, aligned with the central axis of the shank member.

The toggle member 16 is also seen in FIG. 2. It includes a bolt member 28 having a substantial head 30 and a threaded shank portion 32. A heavy duty toggle portion 34, including toggle arms 36 is threaded onto the shank portion 32. The toggle portion 34 should be commercially available, the only constraint being that when in the folded condition thereof the arms 36 should slide freely within the hollow shank member 12, and when they encounter the laterally opposed openings 22 they should be able to freely fold outwardly through the openings 22 under the influence of a torsion spring (not shown) mounted to the pivot pin 38.

The thumbwheel 14 is seen in FIG. 2 to include an outer knurled peripheral wall 40 and a central threaded bore 42, the bore 42 having the same thread as the shank portion 32 of the toggle member 16. The thumbwheel is also drilled as at 44 to receive a length of wire 46 which is attached securely to the thumbwheel and which has a loop portion 48 formed at the free end thereof.

Figure 3:
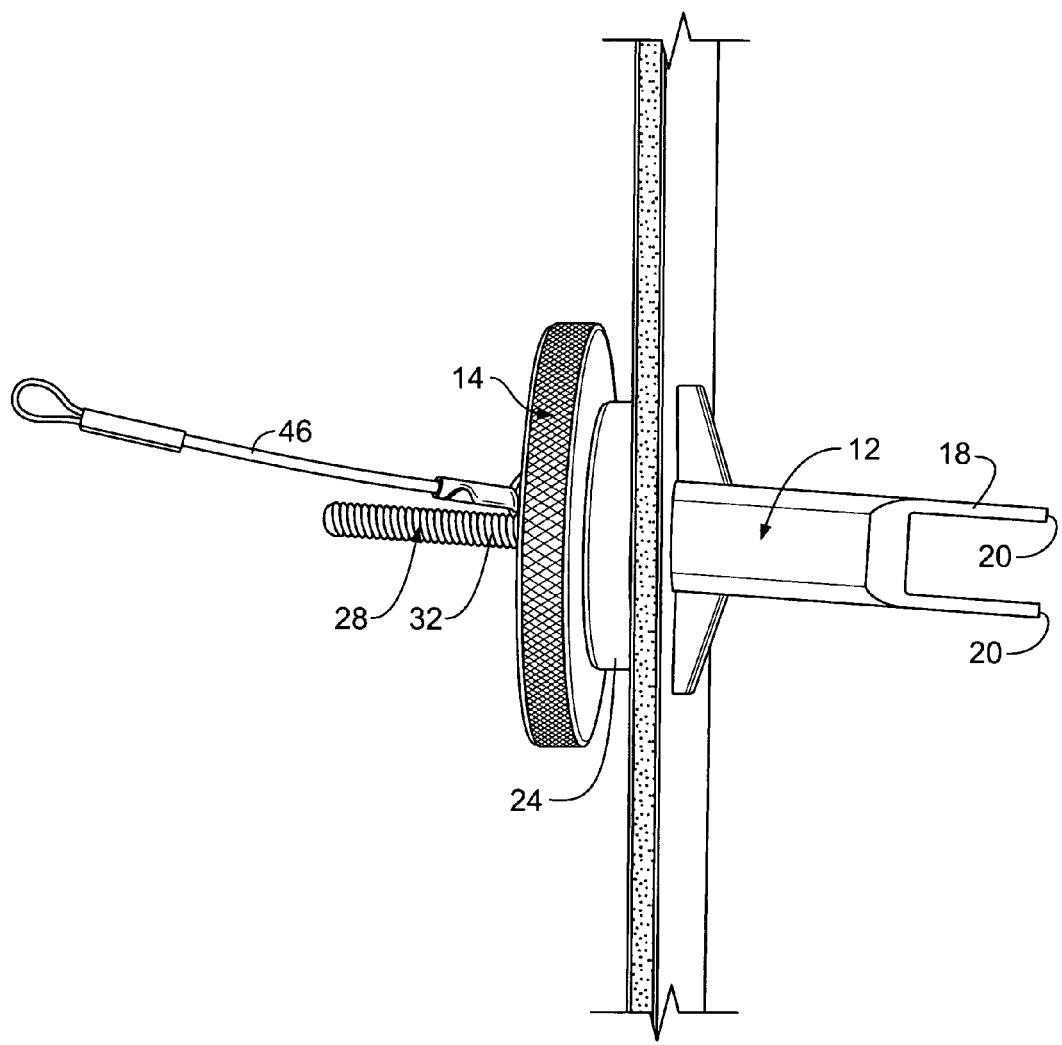
FIG. 3 is a schematic view of the wall CODD in use.

In operation, with the wall CODD in an assembled condition, the toggle arms 36 will be folded and constrained within the hollow shank member 12. The technician will push against the wall CODD, perhaps by hammering against the outer face of the disc 24, to drive the sharp points 20 into and through a sheet of drywall defining a wall of a room, until the rear surface of the disc 24 abuts the outer surface of the wall. The thumbwheel 14 is then pulled away from the wall or the disc 24 to draw the bolt portion outwardly until the toggle arms 36 come into registry with the laterally opposed openings 22, at which point the arms 36 fly outwardly to the position shown in FIG. 3. The thumbwheel 14 is then rotated to bring the toggle arms 36 into a clamping condition against the rear surface of the wall, thereby securely anchoring the wall CODD to the wall at the desired location thereon. A rope, wire or cable can then be passed through the wire loop portion 48 for connection to an item of concern. With the wall CODD positioned at critical location in a room or hallway it is possible to change the direction of pull on the rope, wire or cable with the change of direction taking place at the location of the loop portion 48.

Figure 4:
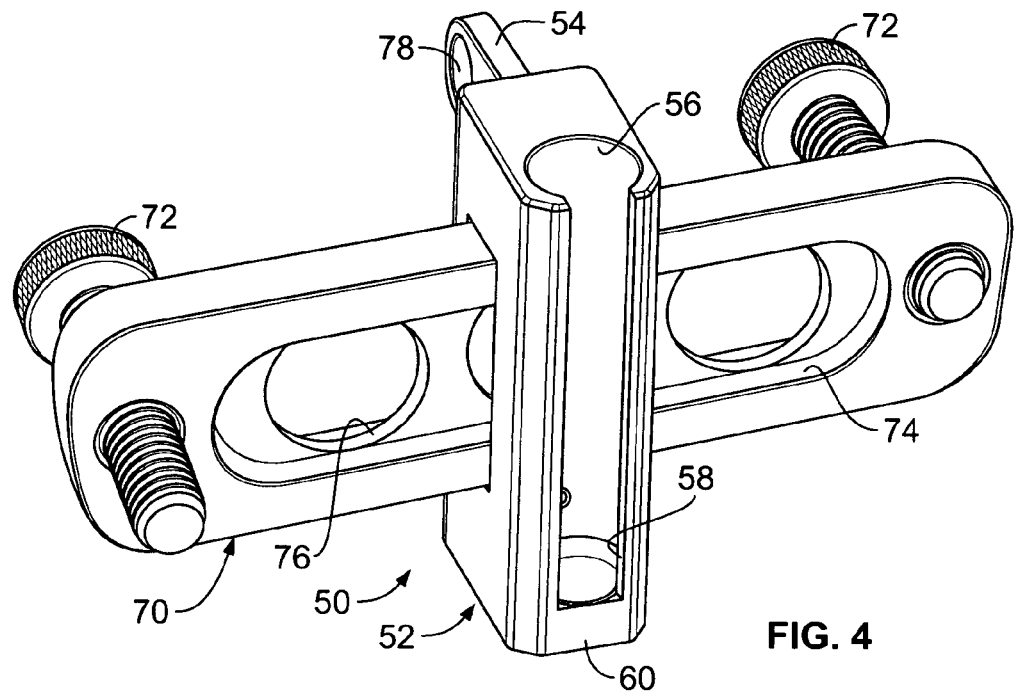
FIG. 4 is a rear perspective view of a hinge CODD.
Figure 5:
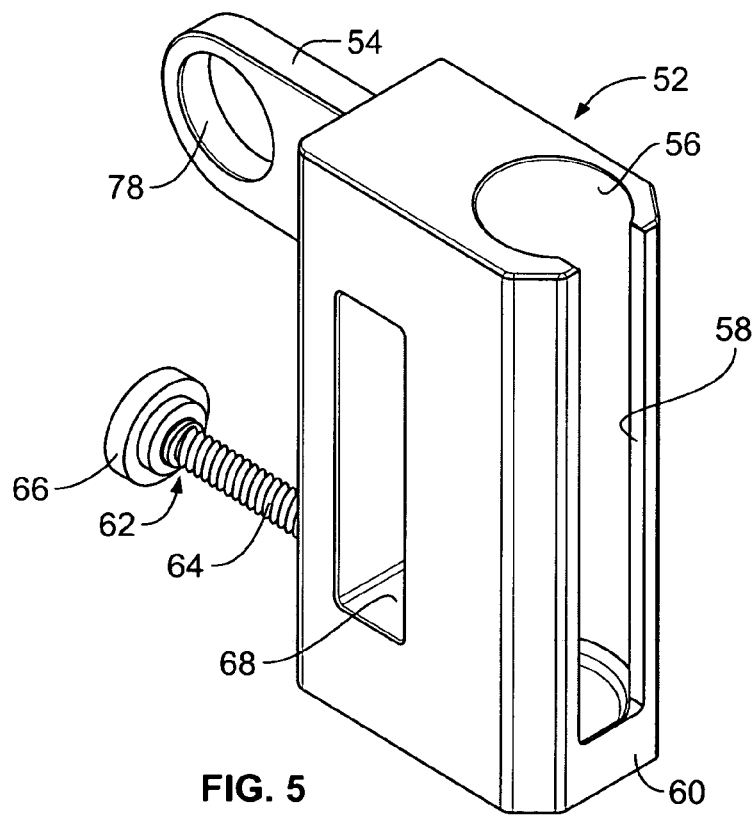
FIG. 5 is a perspective view of a rectangular block used with the hinge CODD.

The hinge CODD of FIG. 4 is intended to perform the same function, i.e. changing the direction of pull of a rope, wire or cable passing therethrough. The hinge CODD 50 includes a rectangular block 52 with an apertured lug 54 welded or otherwise secured thereto, preferably towards one end thereof. As seen in FIGS. 4 and 5 the block 52 has a blind bore 56 extending along the edge of the block opposite the lug 54, of a diameter sufficient to accommodate most hinges in a closed condition thereof. The bore 56 communicates with the exterior of the block 52 by way of an elongated slot 58 which has a width sufficient to accommodate the thickness of a pair of hinge leaves in the closed condition of the hinge. Thus the block 52 can be slid downwardly or upwardly over a closed and protruding hinge and be retained thereon, since the slot 58 has a width which is less than the diameter of the bore 56. The blind bore 56 terminates at an end wall 60 against which the hinge will abut in use of the hinge CODD.

At the end opposite the apertured lug 54 there is a threaded thumbscrew 62 having a threaded shank 64 and a flattened head 66. The shank 64 may have a pointed end (not shown). When the thumbscrew is rotated after the hinge CODD has been positioned on a hinge the end of the shank 64 will extend into or against a portion of the hinge to help anchor the hinge CODD in place.

Figure 6:
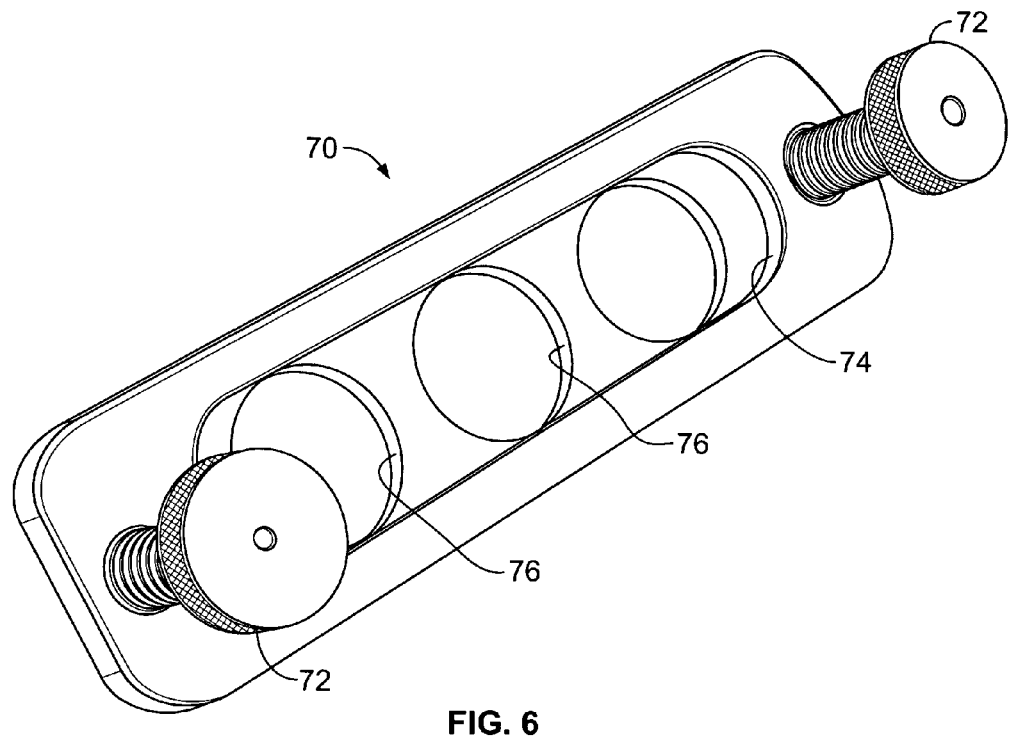
FIG. 6 is a perspective view of the anchor bar used with the hinge CODD.

Improved anchoring is achieved by providing the rectangular block 52 with a rectangular through slot 68 as seen in FIG. 5. A rectangular bar 70, seen in FIGS. 4 and 6 can be received in the slot 68, the bar 70 having a pair of threaded thumbscrews 72 passing therethrough at opposite ends thereof. To save weight the bar 70 can have a slot 74 milled in one or both surfaces thereof and several apertures 76 extending therethrough. In use, the thumbscrews 72 can be rotated to bring the inner ends thereof into clamping contact with a wall or a door so as to help to secure the hinge CODD in place.

The aperture 78 in the apertured lug 54 can receive a rope, wire or cable and will serve as a change of direction point for the pulling of a dangerous item through a building by way of the rope, wire or cable.

Figure 7:
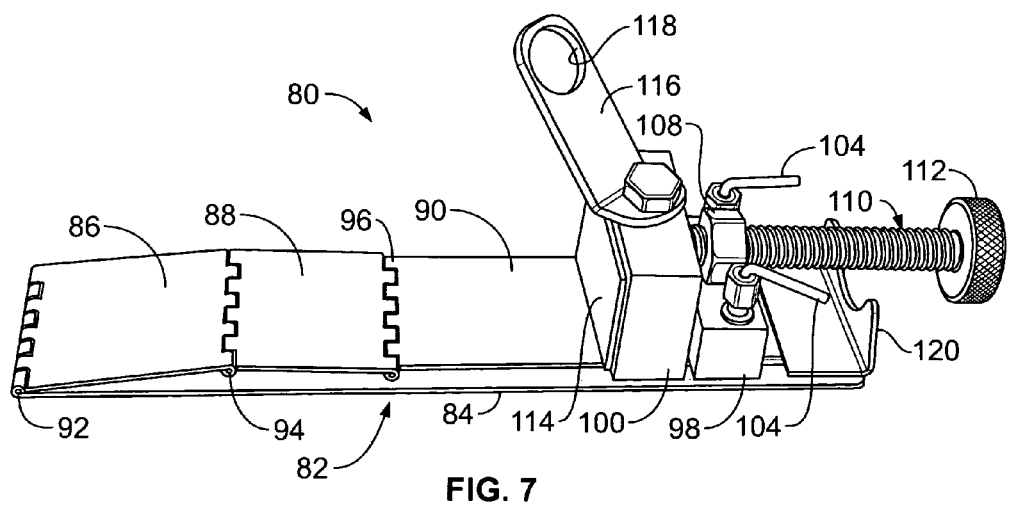
FIG. 7 is a perspective view of the door CODD in its pre-activation condition.

FIG. 7 shows a perspective view of a door CODD 80. This device includes a bottom plate member 82 having a main, lower section 84, a pair of intermediate sections 86, 88, and an upper section 90. The intermediate sections are connected to the main and upper plate sections by hinges 92, 94 and 96. It will be noted that the upper plate section 90 is preferably, but not essentially, slightly narrower than the main or lower plate section 84. A pair of clamping members 98, 100 are provided. These members will be described in greater detail hereinbelow.

The clamping member 98 is generally parallelepiped in shape and extends the width of the main plate section 84. Its lower surface is provided with trapezoidal slots which engage with elongated rails 102 provided on the upper surface of the plate section 84 so that the member can slide therealong. The clamping member or block 98 is provided as well with a pair of spring loaded pins 104 which pass vertically through the block and can lockingly engage with selected ones of locking holes 106 provided in the main plate section 84. A bolt or other threaded element 108 is welded or otherwise secured to the upper surface of the block 98 and a threaded bolt 110 having an enlarged head 112 is threadedly engaged with the bolt 108.

The second clamping member 100 is also parallelepiped in shape and extends the width of the door CODD. Its lower surface is provided with a slot or other means engageable with the upper plate section 90 so that it can slide therealong relative to the upper plate section 90. On its forward face it is provided with a soft facing material 114 for engaging the surface of a door. On its upper surface the member or block 100 is provided with an angled bar 116 which is bolted to that surface. The bar 116 has a through hole 118 at the free end thereof.

The lower plate section 84 is provided with an L-shaped plate 120 at the free end thereof, which plate acts as a handle to facilitate movement of the door CODD.

Figure 8:
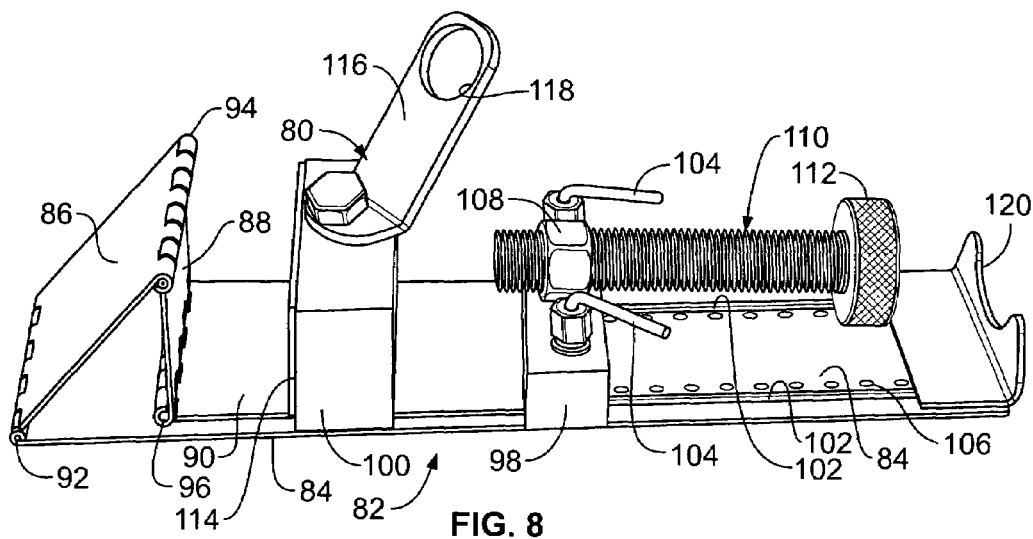
FIG. 8 is a perspective view of the door CODD in its activated condition.
Figure 9:
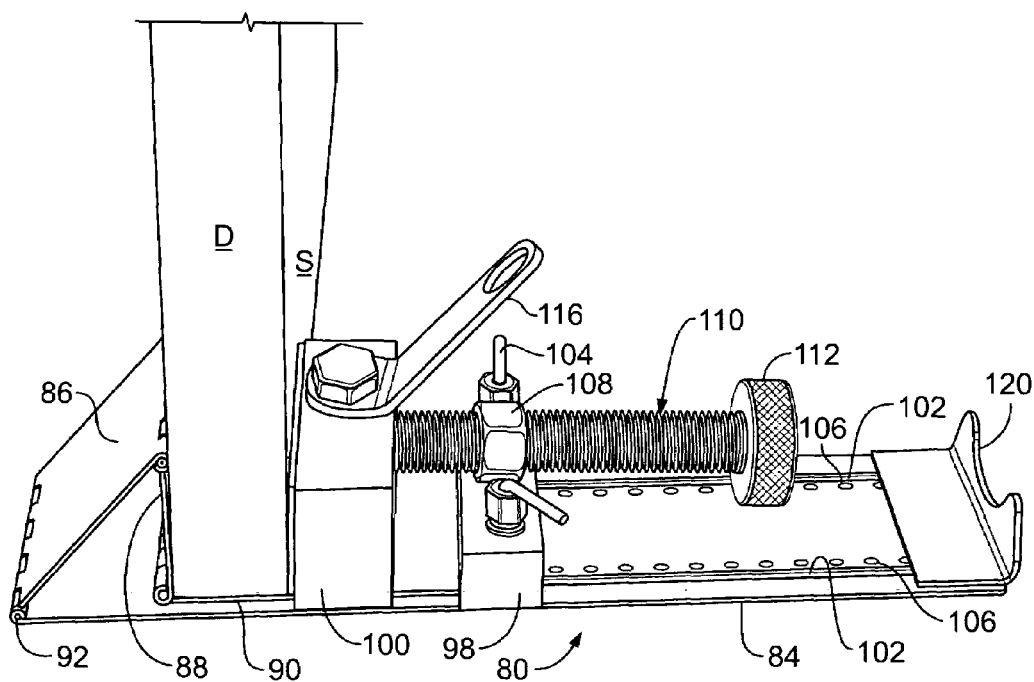
FIG. 9 is a side perspective view showing the door CODD in position, clamped against a door.

In use, the technician would start with the door CODD set up as in FIG. 7, with the intermediate plate sections 86, 88 and the upper plate section 90 lying flat on top of the lower plate section 84, and with the clamping blocks 98, 100 retracted so that they are close to each other and to the handle or plate 120. The technician would then slide the unit under the lower or bottom edge of a door D (FIG. 9) so that the intermediate plate sections 86, 88 are on the opposite side of the door and so that the facing material 114 of the block 100 is brought into abutment with the adjacent surface S of the door. While holding both blocks 98, 100 in position at the door, the technician would then pull backwards on the handle 120 so as to draw the lower plate section 84 towards him, away from the surface S. This has the effect of causing the intermediate sections to raise to the positions shown in FIG. 8, with the shorter intermediate plate 88 in a generally vertical orientation and the longer intermediate plate 86 in a forwardly and downwardly angled orientation. The shorter intermediate plate 88 will also be in abutment with the opposite surface of the door. The technician would then fix the spring-loaded pins 104 into the locking holes 106 closest thereto to lock the clamping member or block 98 with respect to the lower plate section 84. The threaded bolt 110 would then be rotated so that the free end thereof of brought to bear against the adjacent surface of the clamping member or block 100 so as to clamp that member against the door, trapping and clamping the door between the clamping member 100 and the shorter intermediate plate section 88. A rope, wire or cable can then be passed through the aperture 118 and the device utilized in the same manner as the other CODD's described above.

It is not essential that the shorter intermediate plate section 88 of the door CODD be exactly parallel to the inner door surface to achieve effective clamping. It is only essential that a portion of the shorter intermediate plate section, or even just the hinge connecting the two intermediate plate sections together, contact the inner surface of the door when the clamping member 100 abuts the outer surface of the door. Clearly, the door CODD can thus be used with doors of different thicknesses.

The foregoing has described a new tool for technicians who are faced with removal of hazardous items from buildings or other areas. It should be noted that the CODD's described herein are not restricted in their usage to the interiors of buildings. They can be used outside or in any area where there is an appropriate wall, hinge or door to which the appropriate CODD can be secured.

The invention claimed is:

1. A change of direction device for use with a rope, wire or cable adapted to be connected to an item for pulling such item, comprising: an elongated, hollow shank member having a sharp end for penetrating a wall, an abutment plate at an end opposite said sharp end, and a pair of laterally opposed openings in a side wall thereof; a toggle-type anchoring means including an elongated threaded rod extending along said shank member and through said abutment plate, said rod including a pair of foldable toggle arms threadedly attached thereto within said shank member; and thumbwheel means threadedly engaged with said threaded rod, said thumbwheel means including wire loop means secured thereto;

whereby in use said shank member is caused to penetrate said wall, bringing said abutment plate into abutting engagement with an outer surface of said wall, and said thumbwheel means, engaged with said threaded rod, is initially pulled away from said wall to bring said toggle arms into registry with said laterally opposed opening to permit said toggle arms to extend laterally through said openings and outwardly of said shank member, and then said thumbwheel means is rotated to bring said toggle arms into clamping contact with a rear surface of said wall, the rope, wire or cable being then passed through said wire loop for effecting a change in the direction of pull being applied thereto.

2. The device of claim 1 wherein said thumbwheel means has a knurled peripheral edge and said wire loop means comprises an elongated length of wire connected at one end to said thumbwheel means and including a closed loop at the other end thereof.

3. A change of direction device for use with a rope, wire or cable adapted to be connected to an item for pulling such item, comprising: an elongated block member having a blind bore extending along one elongated edge thereof, said bore being of a diameter sufficient to receive the cylindrical portion of a closed hinge; an elongated slot exposing said bore, said slot having a width sufficient to receive a pair of hinge sleeves in the closed condition of the hinge; an apertured lug extending outwardly of said block member; and means for securing said device when mounted to a hinge of a door or the like;

whereby said device can be mounted and securely anchored to a hinge, with the rope, wire or cable being then passed through the aperture of said lug for effecting a change in the direction of pull being applied thereto.

4. The device of claim 3 wherein said securing means comprises thumbscrew means having a threaded shank received in a threaded bore of said block member, such bore opening to said blind bore whereby said thumbscrew means can be rotated in said threaded bore into securing engagement with the cylindrical portion of the hinge.

5. The device of claim 4 wherein said securing means comprises a transverse slot through said block member, a generally rectangular bar member receivable with said transverse slot, and thumbscrew means at each end of said bar member threadedly received in a corresponding threaded bore of said bar member for anchoring engagement with a surface on each side of the hinge.

6. The device of claim 5 wherein said bar member includes an elongated slot in at least one side thereof and a plurality of apertures extending through said bar member from one side thereof to the other side.

7. A change of direction device for use with a rope, wire or cable adapted to be connected to an item for pulling such item, comprising: an elongated bottom plate member including a main plate section, a pair of intermediate plate sections and an upper plate section, said intermediate plate sections being hingedly connected to each other and to adjacent ends of said main and upper plate sections respectively; said main plate section including a pair of guide rails thereon and a plurality of spaced apart locking holes therethrough; a first clamping member positioned on said main plate section for guided movement therealong on said rails, said first clamping member including locking pin means for locking engagement with selected ones of said locking holes, and also including an adjustable threaded clamping bolt thereon; and a second clamping member positioned on said upper plate section for guided movement therealong, said second clamping member including an apertured lug attached thereto;

whereby in use said bottom plate member can be slid under the bottom edge of a door to bring said second clamping member into contact with an adjacent door surface, said lower plate section can then be drawn away from said door to raise said intermediate plate sections such that one of said intermediate plate sections assumes a generally vertical orientation and is in abutment with an opposite door surface, said first clamping member can be locked relative to said main plate member and said clamping bolt can be brought into clamping relation to said second clamping block so as to clamp said door between said second clamping block and said one intermediate plate section, with the rope, wire or cable being then passed through the aperture of said lug for effecting a change in the direction of pull being applied thereto.

8. The device of claim 7 wherein said upper plate section is narrower than said bottom plate member and passes through slot means in said second clamping member for guided movement of said second clamping member therealong.

9. The device of claim 7 wherein said locking pins are spring-loaded.

10. The device of claim 7 wherein said second clamping member includes a layer of soft facing material on a surface thereof intended for contact with a door surface in use of said device.

11. The device of claim 7 including handle means at a free end of said bottom plate member.

* * * * *